United States Patent
Curtis et al.

(10) Patent No.: US 9,509,760 B2
(45) Date of Patent: Nov. 29, 2016

(54) VIRTUAL PACKET ANALYZER FOR A CLOUD COMPUTING ENVIRONMENT

(71) Applicant: Verizon Patent and Licensing Inc., Basking Ridge, NJ (US)

(72) Inventors: Paul M. Curtis, Sudbury, MA (US); Marc J. Cochran, Shrewsbury, MA (US); Kevin J. Clarke, Reading, MA (US); Michael J. Matczynski, Waltham, MA (US); Chitz Shung, Clinton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/028,825

(22) Filed: Sep. 17, 2013

(65) Prior Publication Data

US 2015/0081766 A1    Mar. 19, 2015

(51) Int. Cl.
*G06F 15/16* (2006.01)
*H04L 29/08* (2006.01)

(52) U.S. Cl.
CPC .................... *H04L 67/10* (2013.01)

(58) Field of Classification Search
USPC ................................................ 709/203, 204
See application file for complete search history.

(56) References Cited

U.S. PATENT DOCUMENTS

| | | | | |
|---|---|---|---|---|
| 2009/0119661 | A1* | 5/2009 | Bernoth | G06F 8/67 717/176 |
| 2010/0115606 | A1* | 5/2010 | Samovskiy | H04L 12/4641 726/15 |
| 2010/0322095 | A1* | 12/2010 | Okada | H04L 43/0835 370/252 |
| 2012/0106358 | A1* | 5/2012 | Mishra | H04L 43/0817 370/242 |
| 2012/0230186 | A1* | 9/2012 | Lee | H04L 43/028 370/230 |
| 2012/0230202 | A1* | 9/2012 | Reed | H04L 63/0209 370/241 |

\* cited by examiner

*Primary Examiner* — Vivek Srivastava
*Assistant Examiner* — Hermon Asres

(57) ABSTRACT

A device, of a cloud computing environment, receives an instruction to create a virtual packet analyzer from a user device associated with a user. The device creates the virtual packet analyzer in the device based on the instruction, and receives a packet provided in a portion of the cloud computing environment associated with the user. The virtual packet analyzer determines information associated with the packet, and determines whether to duplicate the packet based on the information. The virtual packet analyzer processes the packet based on whether the packet is to be duplicated. A duplicate packet of the packet is generated when it is determined that the packet is to be duplicated, and is transmitted to another device to identify or resolve a problem within the portion. The packet is transmitted to a destination of the packet when it is determined that the packet is not to be duplicated.

20 Claims, 15 Drawing Sheets

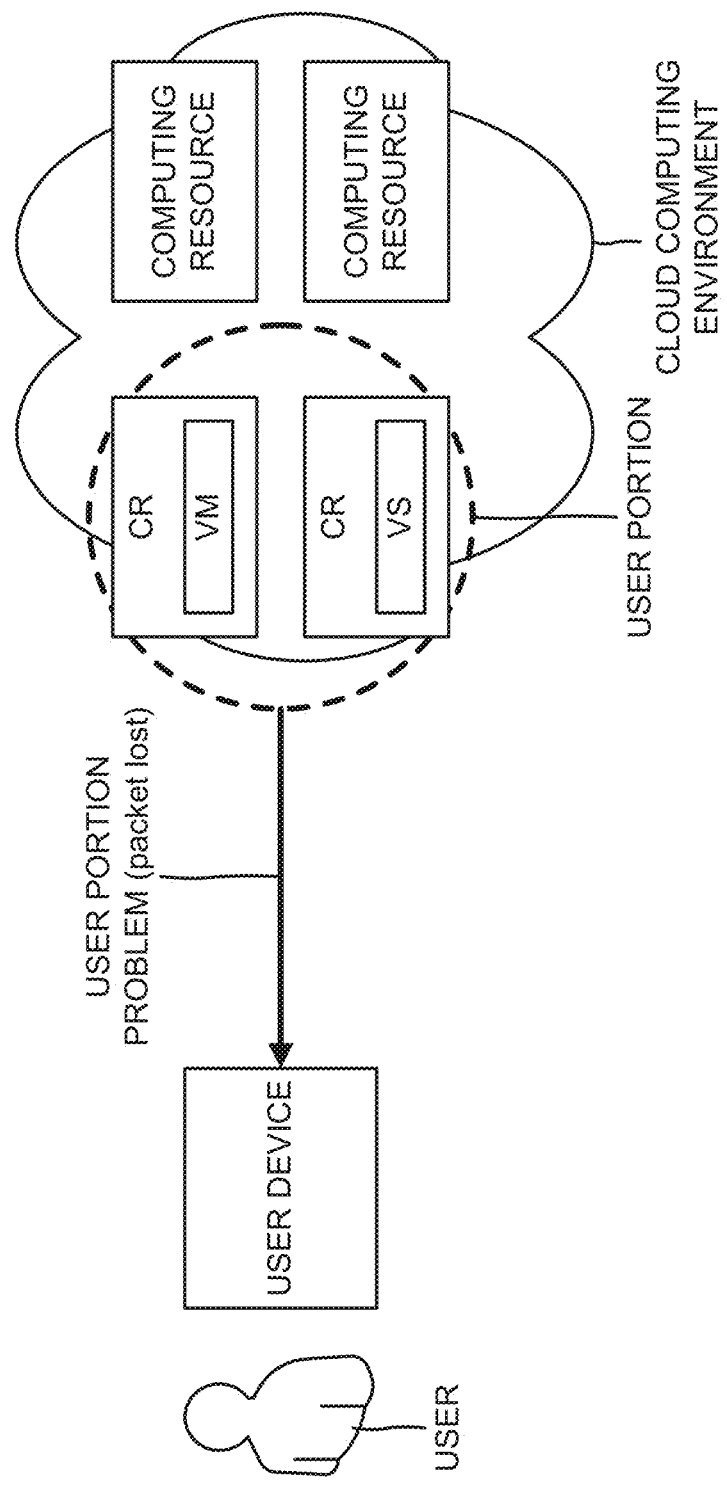

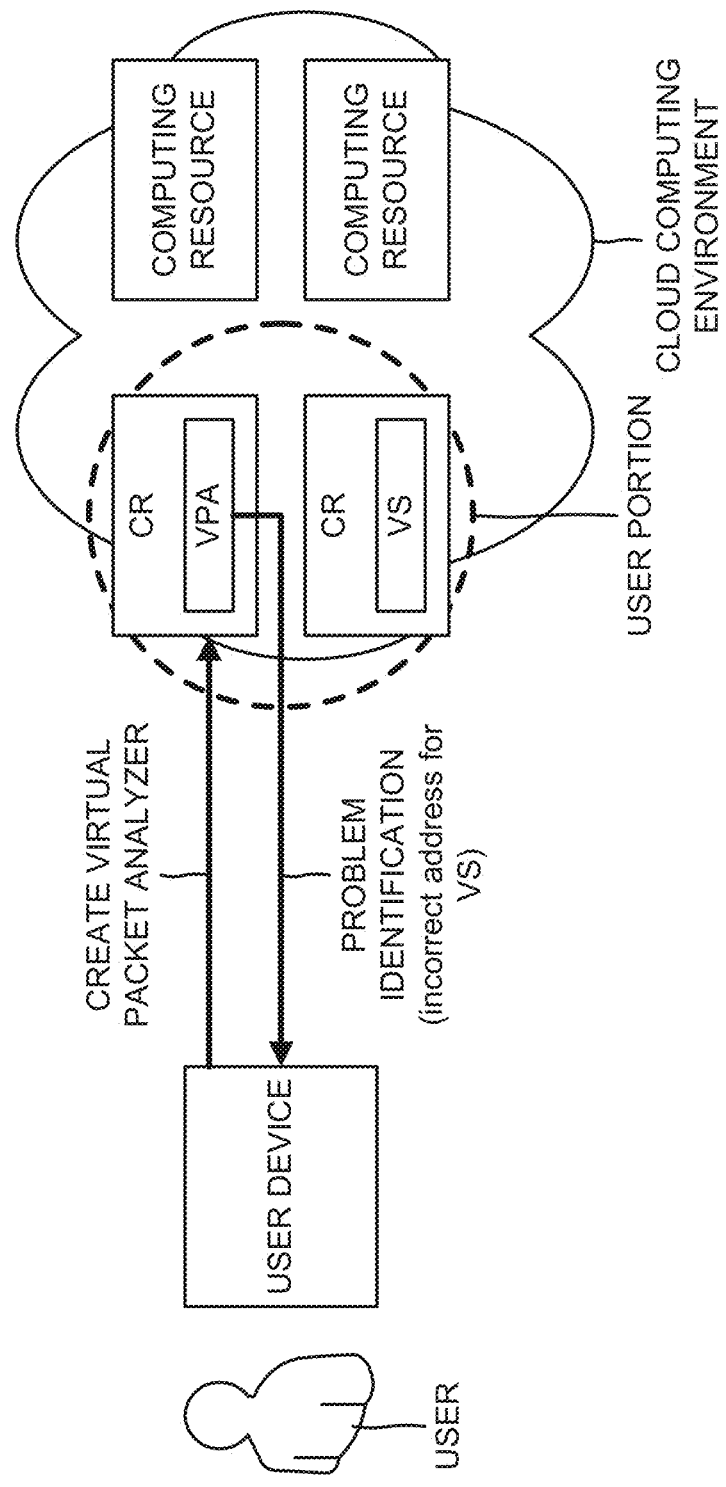

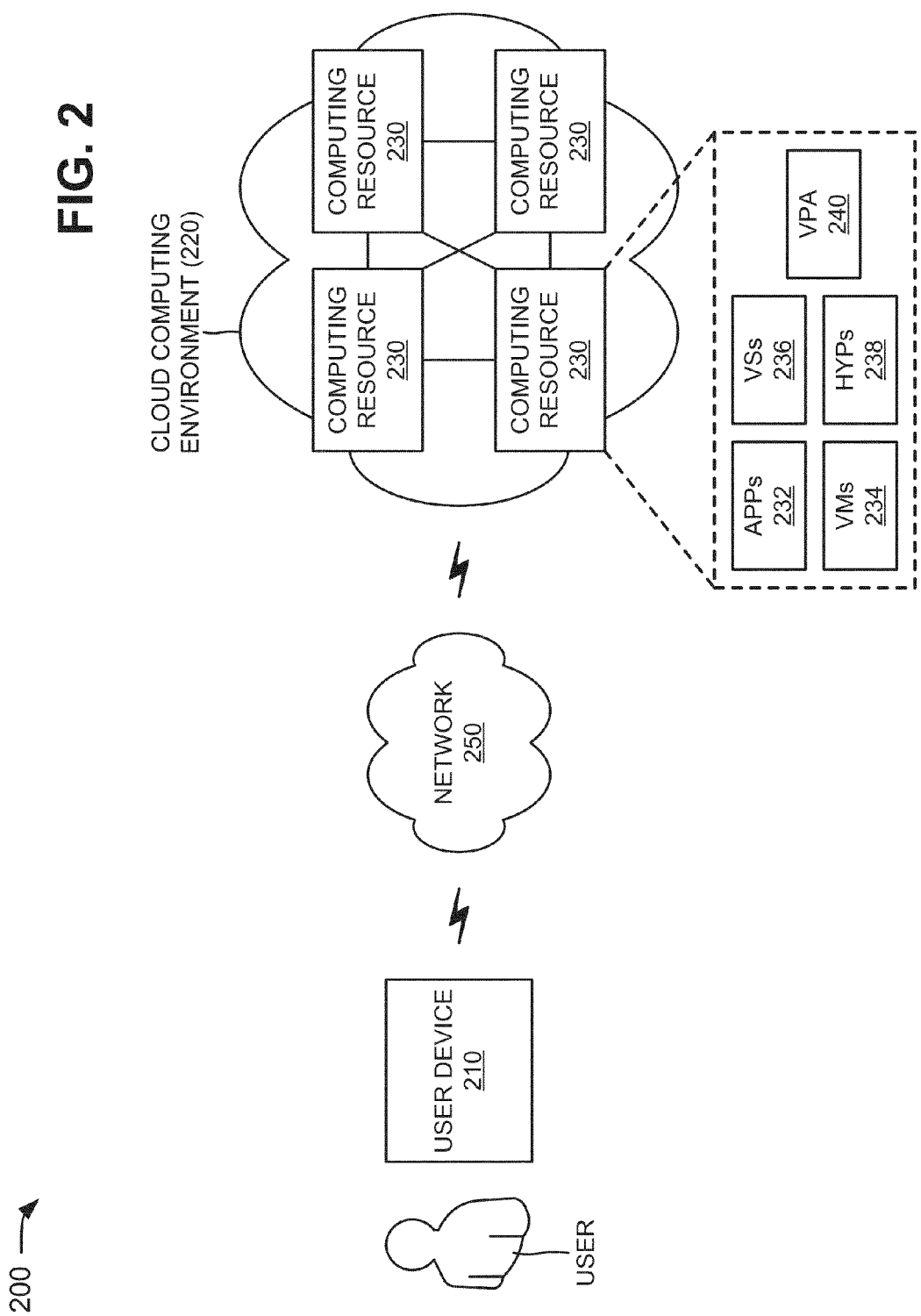

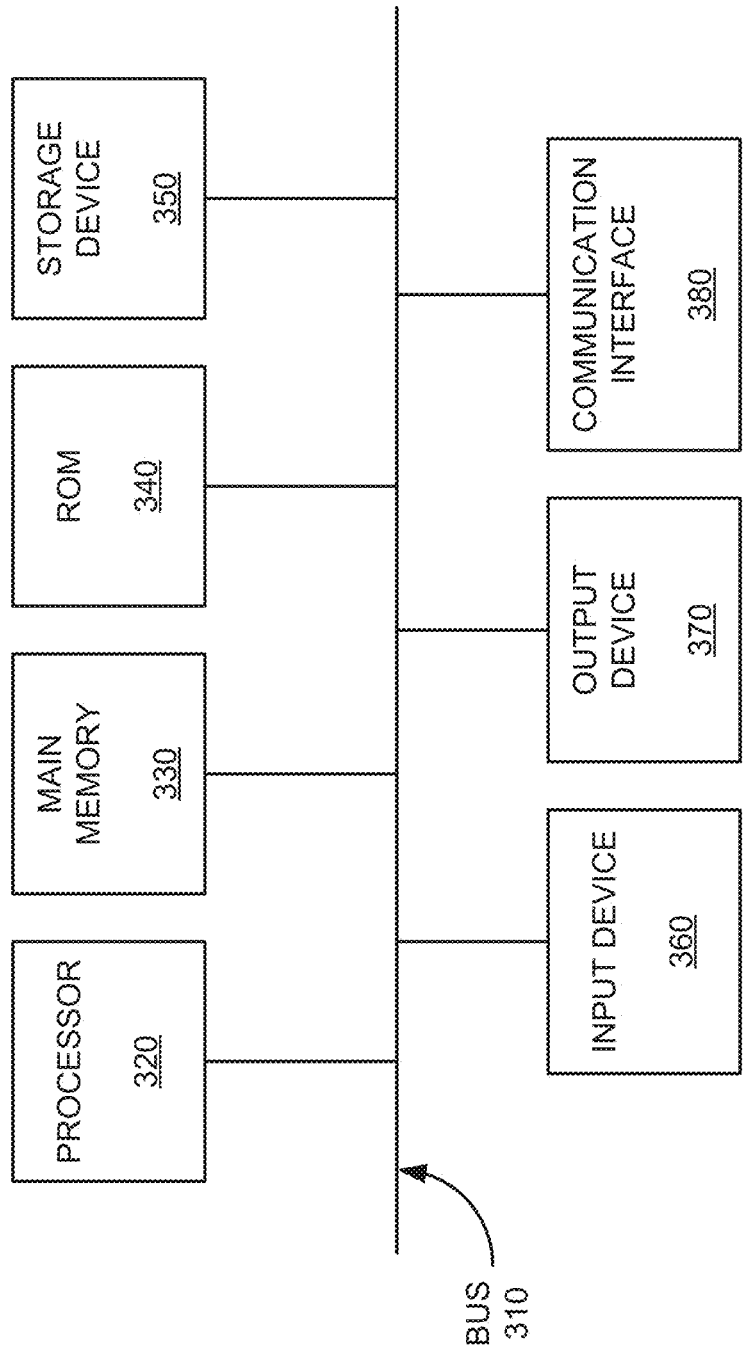

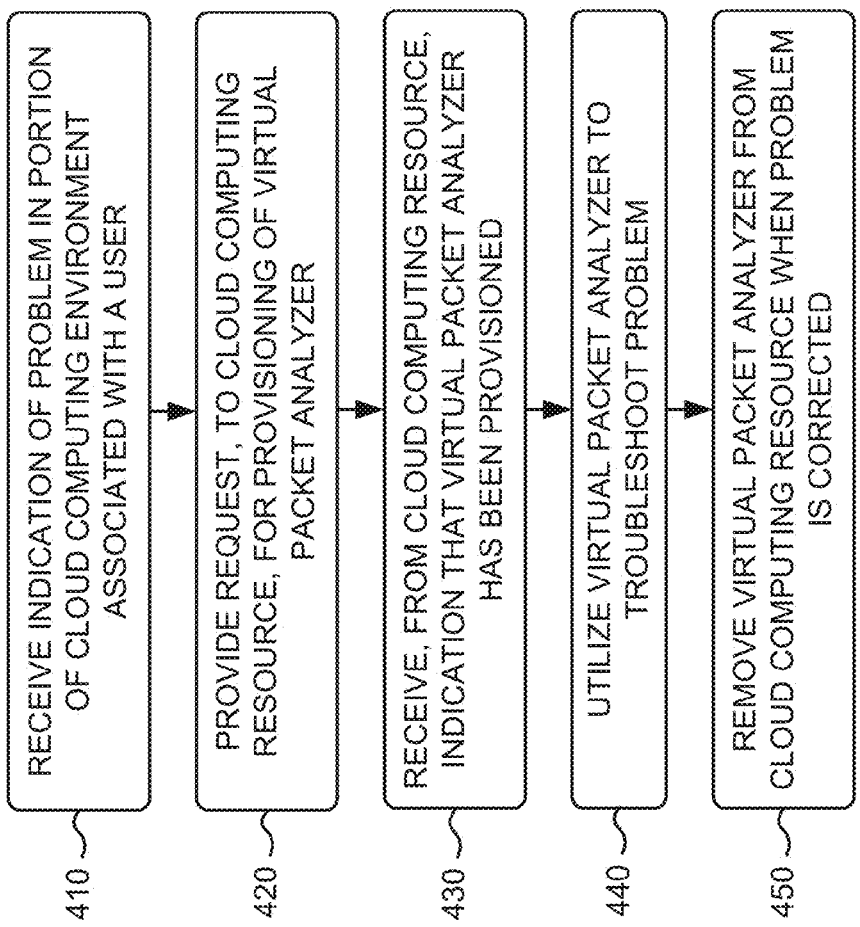

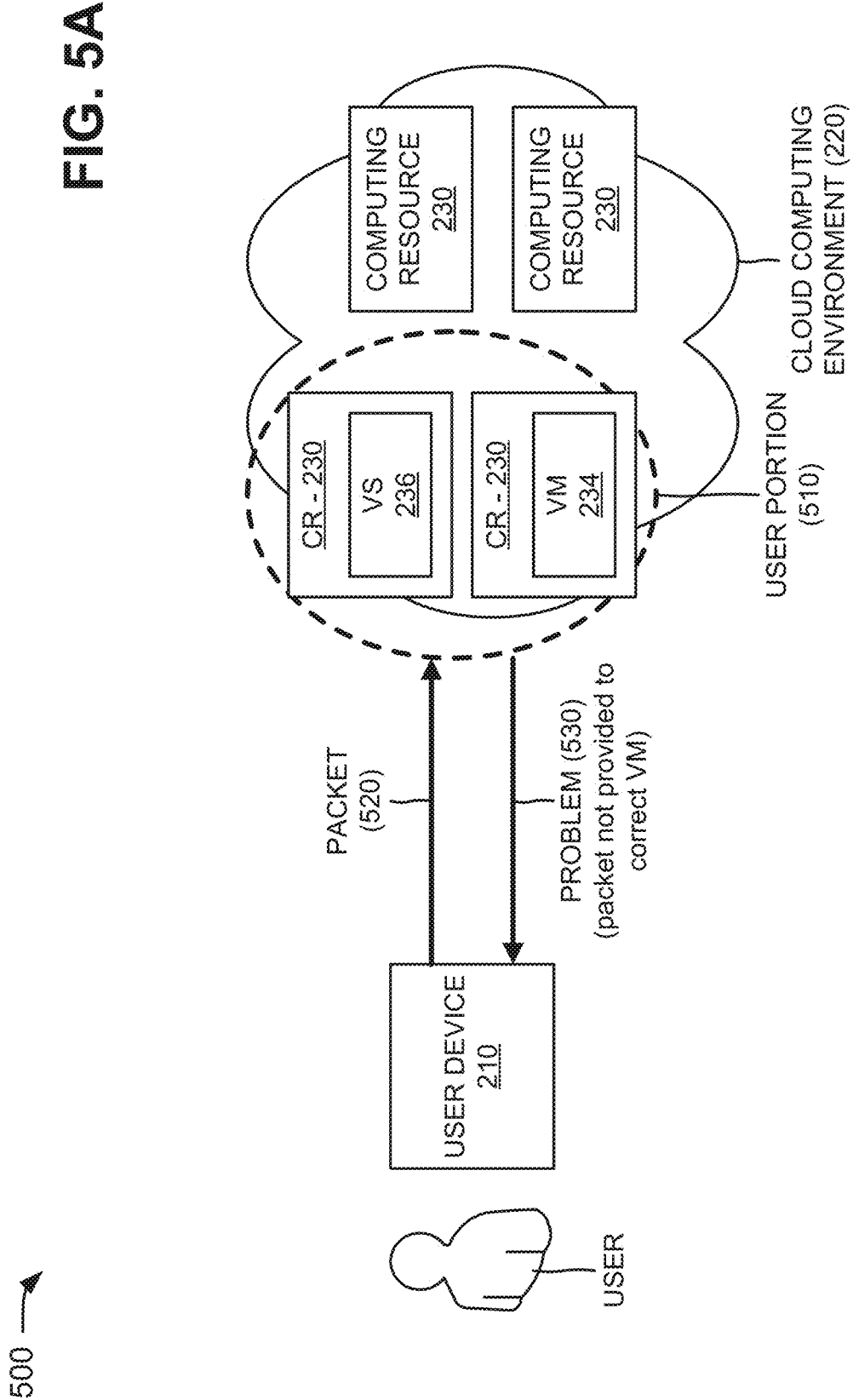

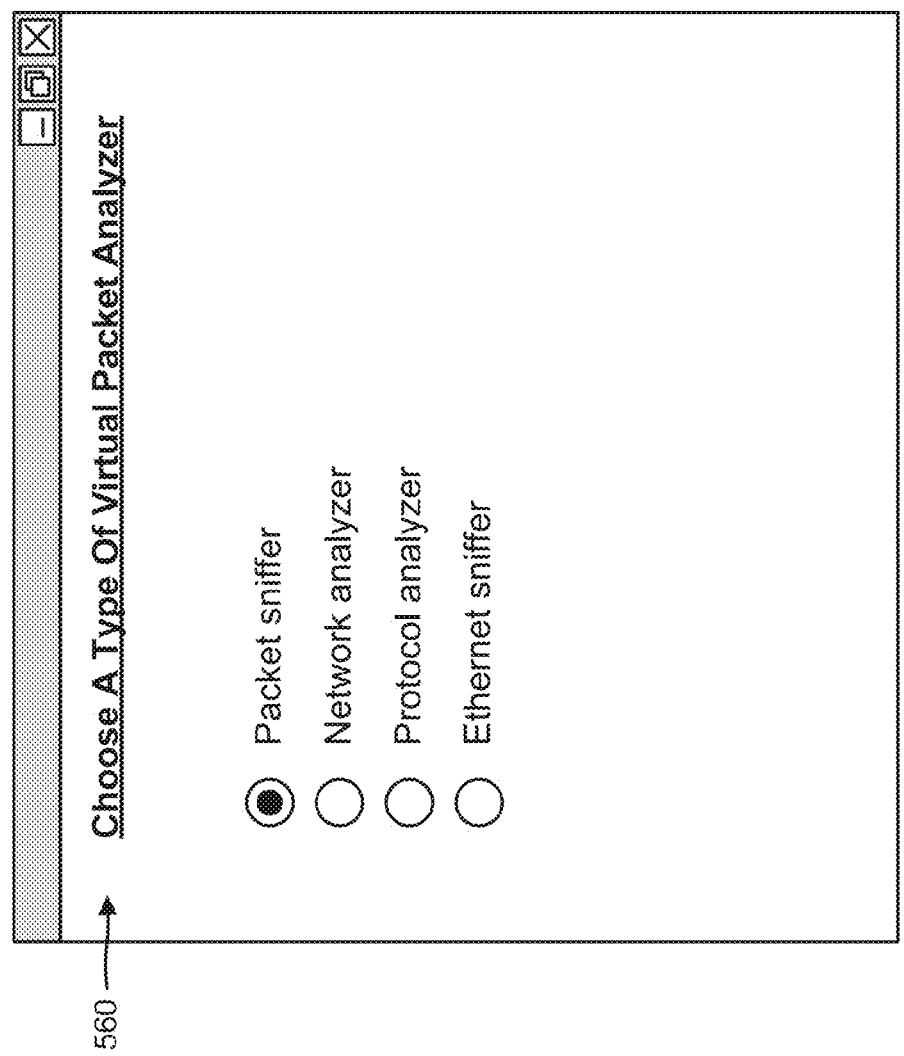

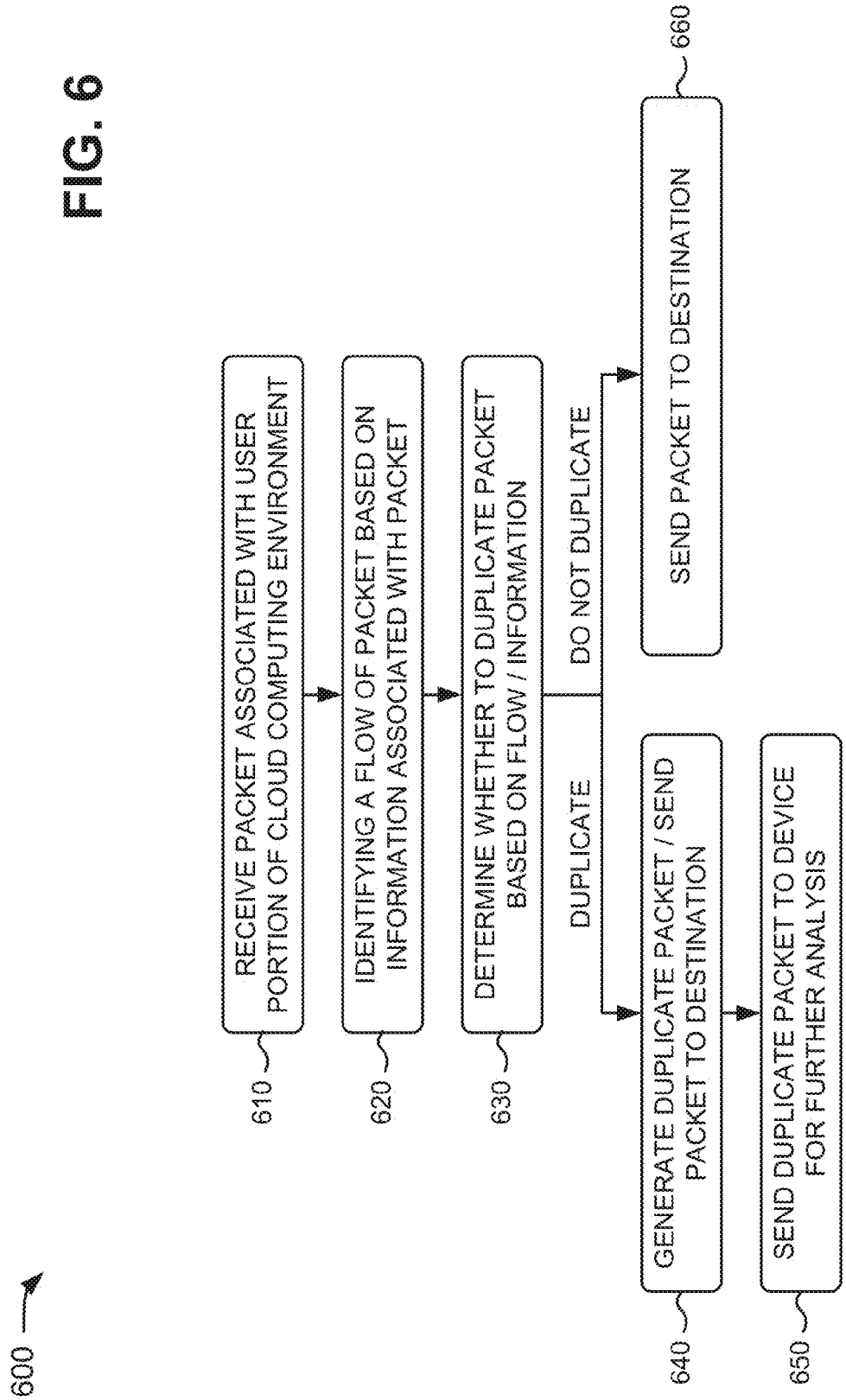

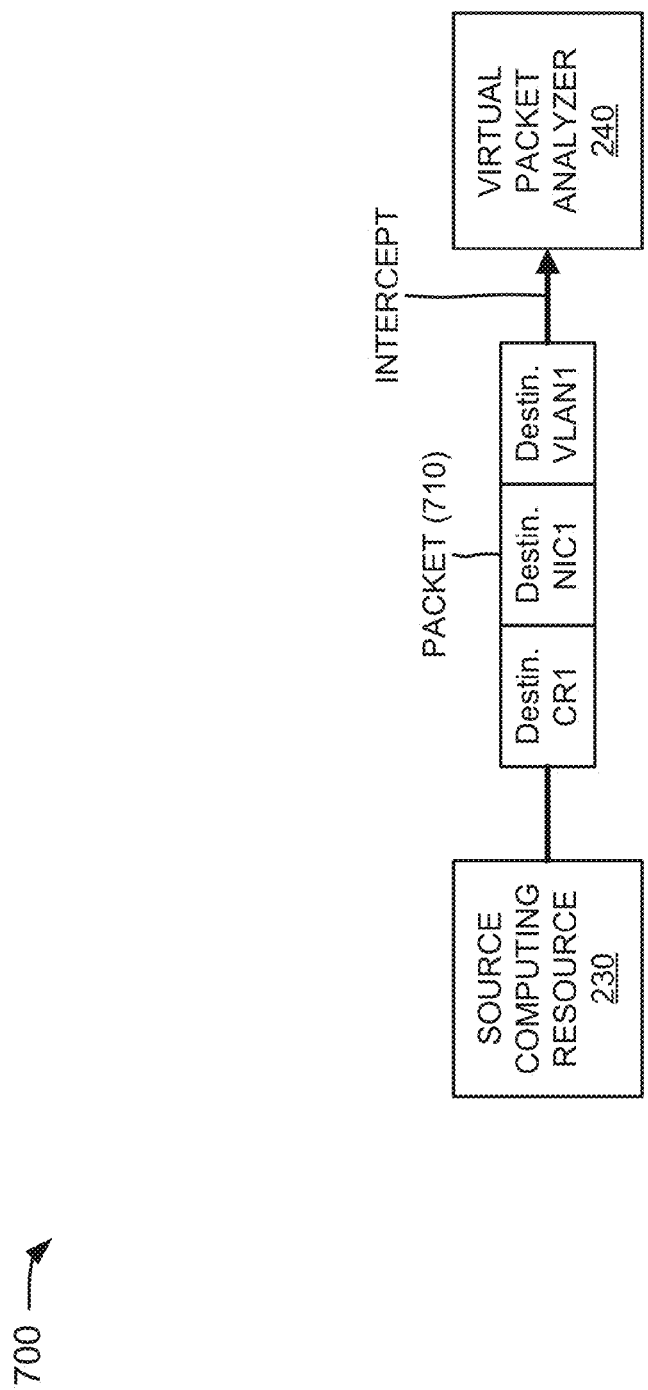

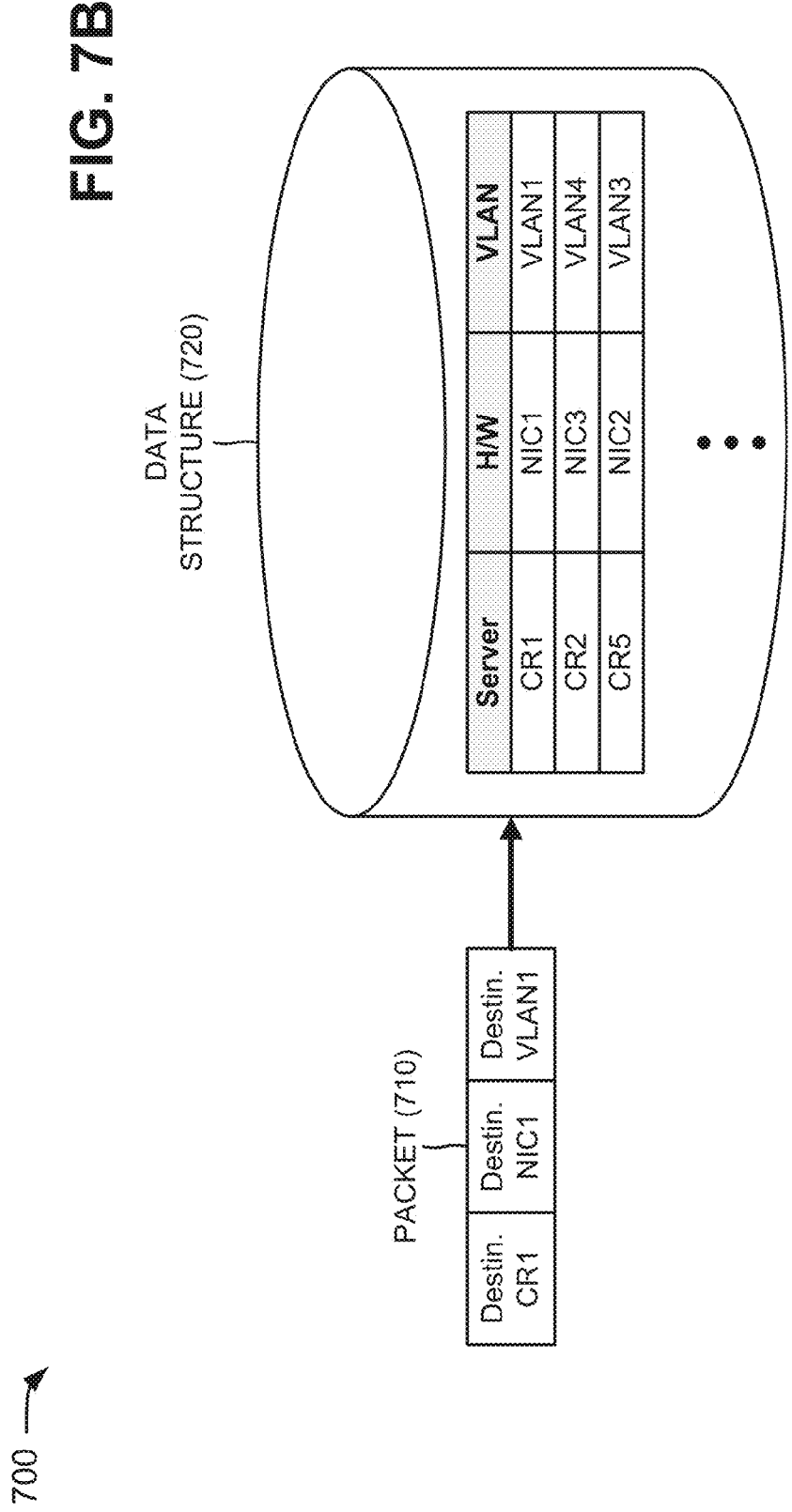

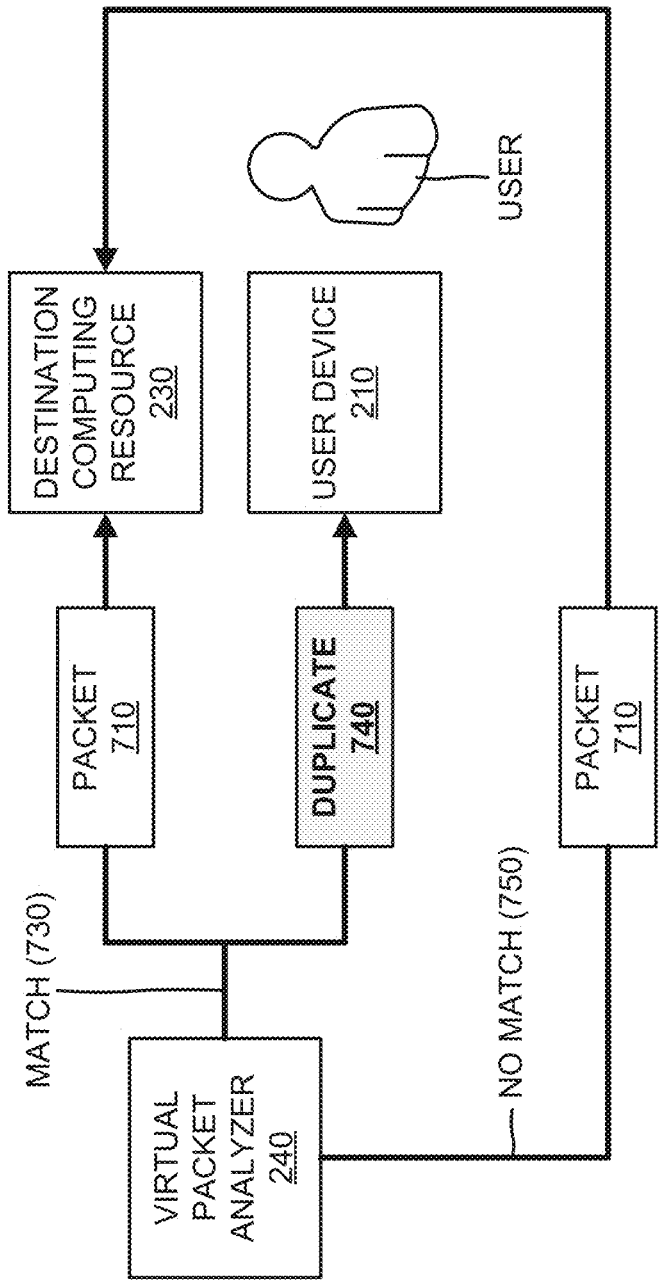

VIRTUAL PACKET ANALYZER FOR A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. One or more users may create one or more VMs in the cloud computing environment. However, users may not properly configure the created VMs, and packets may be dropped in the cloud computing environment due to the improperly configured VMs. Such users may request that a provider of the cloud computing environment debug problems with the improperly configured VMs. This may unnecessarily strain resources available to the provider of the cloud computing environment.

BRIEF DESCRIPTION OF THE DRAWINGS

FIGS. 1A and 1B are diagrams of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for providing a virtual packet analyzer in a cloud computing environment;

FIGS. 5A-5F are diagrams of an example of the process described in connection with FIG. 4;

FIG. 6 is a flow chart of an example process for utilizing a virtual packet analyzer in a cloud computing environment; and FIGS. 7A-7C are diagrams of an example of the process described in connection with FIG. 6.

DETAILED DESCRIPTION OF PREFERRED EMBODIMENTS

Figure 5B:
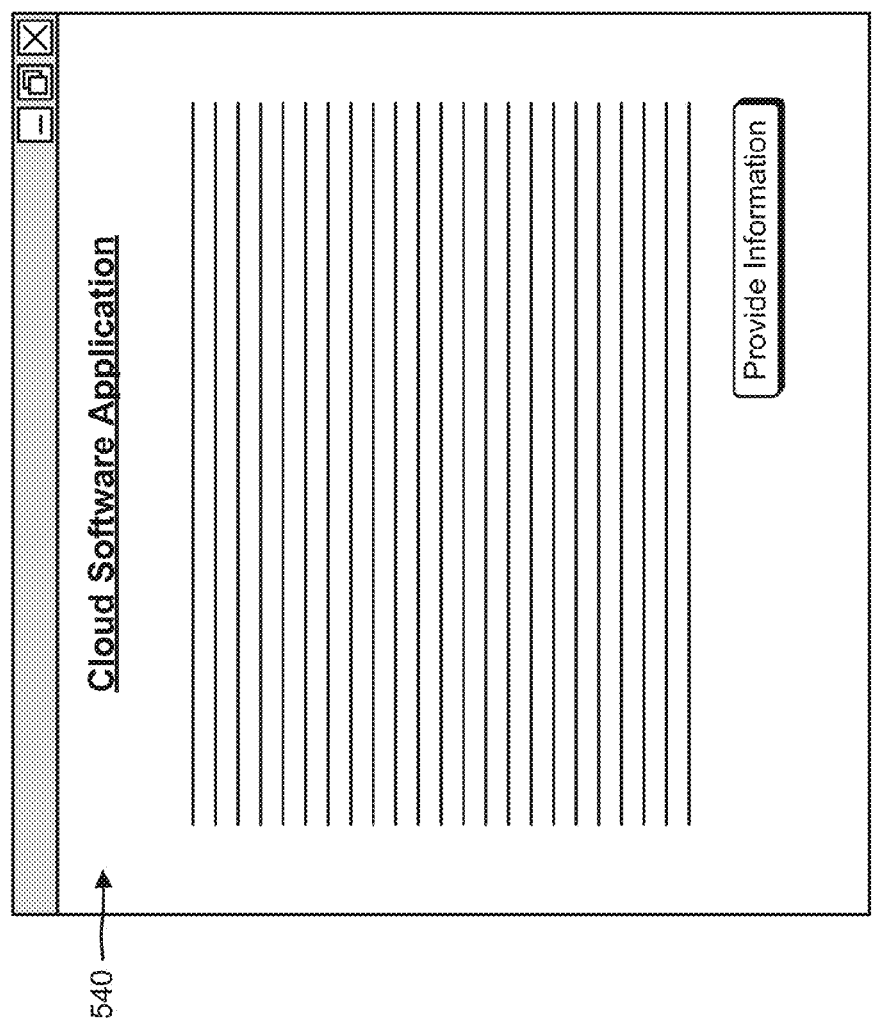

The following detailed description refers to the accompanying drawings. The same reference numbers in different drawings may identify the same or similar elements.

Systems and/or methods described herein may provide a tool (e.g., a virtual packet analyzer) that enables a user to debug problems associated with cloud resources (e.g., VMs, virtualized storage, hypervisors, etc.) allocated to the user in a cloud computing environment. A virtual packet analyzer (e.g., which may include a packet sniffer, a network analyzer, a protocol analyzer, etc.) may intercept and log packets transmitted within the cloud computing environment (e.g., to and/or from the user's cloud resources). As packets flow across the cloud computing environment, the virtual packet analyzer may capture packets and, if needed, may decode each captured packet's raw data, showing values of various fields in the packet. The virtual packet analyzer may analyze the packet content according to particular standards, rules, policies, and/or other specifications. Based on this analysis, the virtual packet analyzer may identify any problems associated with the packet.

FIGS. 1A and 1B are diagrams of an overview of example implementations described herein. For the overview, assume that a cloud computing environment includes computing resources (CRs) that provide cloud resources (e.g., VMs, virtualized storage, hypervisors, etc.) for users of the cloud computing environment, as shown in FIG. 1A. Further assume that a user is allocated one or more computing resources of the cloud computing environment and that the allocated computing resources create a user portion of the cloud computing environment. For example, a first computing resource may provide a VM for a user device (e.g., a desktop computer, a tablet computer, etc.) associated with a user, and a second computing resource may provide virtualized storage (VS) for the user device.

The user may utilize the user device to interact with the user portion of the cloud computing environment. For example, the user may utilize a software application provided by the user portion of the cloud computing environment. As further shown in FIG. 1A, the user may experience a problem during the user's interaction with the user portion of the cloud computing environment. For example, a packet may be lost when the user is utilizing the software application provided by the user portion. The user device may receive an indication of the problem, and may display the indication to the user.

Based on the problem indication, the user may utilize the user device to instruct a computing resource of the user portion to create a virtual packet analyzer (VPA), as shown in FIG. 1B. For example, the user device may instruct the first computing resource to create a virtual packet analyzer. The virtual packet analyzer may intercept and log packets passing over the user portion of the cloud computing environment. As the packets flow across the user portion, the virtual packet analyzer may capture each packet, and may decode each packet's raw data, showing values of various fields in the packet. The virtual packet analyzer may analyze the packet content according to particular standards (e.g., Request for Comments (RFCs) published by the Internet Engineering Task Force (IETF)), rules, policies, and/or other specifications.

Based on this analysis, the virtual packet analyzer may identify any problems associated with the packet. For example, assume that the virtual packet analyzer determines that the problem is that the virtualized storage of the second computing resource has an incorrect address. As shown in FIG. 1B, the virtual packet analyzer may provide an identification of the problem to the user device, and the user device may display the problem identification to the user. In some implementations, the virtual packet analyzer may capture each packet of the user portion, and may determine whether the packet meets particular standards, rules, policies, and/or other specifications. If the packet does not meet the particular standards, rules, policies, and/or other specifications, the virtual packet analyzer may duplicate the packet and may provide the duplicate packet to a device (e.g., the user device) for further analysis. If the packet meets the particular standards, rules, policies, and/or other specifications, the virtual packet analyzer may provide the packet to the packet's destination.

Such an arrangement may enable users to debug problems with cloud resources allocated to the users of a cloud computing environment. The provider of the cloud computing environment may not need to field the problems since the problems may be fixed by the users without the provider's intervention. The arrangement may also enable third parties, (e.g., government agencies, law enforcement, etc.) to monitor packets associated with the users of the cloud computing environment.

FIG. 2 is a diagram of an example environment 200 in which systems and/or methods described herein may be implemented. As illustrated, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant (PDA), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230). Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VS) 236, one or more hypervisors (HYPs) 238, a virtual packet analyzer (VPA) 240, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Virtual packet analyzer 240 may include a component that intercepts and logs packets passing through cloud computing environment 220. As the packets flow across cloud computing environment 220, virtual packet analyzer 240 may capture packets, and may decode each captured packet's raw data, showing values of various fields in the packet. Virtual packet analyzer 240 may analyze the packet content according to particular standards (e.g., RFCs), rules, policies, and/or other specifications.

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. Each of the devices of environment 200 may include one or more devices 300 and/or one or more components of device 300. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include one or more processors, microprocessors, application-specific integrated circuits (ASICs), field-programmable gate arrays (FPGAs), or other types of processing components that interpret and execute instructions. Main memory 330 may include one or more random access memories (RAMs) or other types of dynamic storage devices that store information and/or instructions for execution by processor 320. ROM 340 may include one or more ROM devices or other types of static storage devices that store static information and/or instructions for use by processor 320. Storage device 350 may include a magnetic and/or optical recording medium and its corresponding drive, or a removable memory, such as a flash drive.

Input device 360 may include a component that permits a user to input information to device 300. Output device 370 may include a component that outputs information to the user. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processor 320 executing software instructions contained in a computer-readable medium, such as main memory 330. A computer-readable medium may be defined as a non-transitory memory device. A memory device may include space within a single physical storage device or spread across multiple physical storage devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for providing a virtual packet analyzer in a cloud computing environment. In some implementations, process 400 may be performed by user device 210. In some implementations, process 400 may be performed by another device or a group of devices separate from or including user device 210.

As shown in FIG. 4, process 400 may include receiving an indication of a problem in a portion of a cloud computing environment associated with a user (block 410). For example, a user associated with user device 210 may be allocated a portion of cloud computing environment 220. The user may utilize the portion of cloud computing environment 220 to perform a number of tasks (e.g., to store information, execute software applications, etc.). In some implementations, the user may experience a problem when utilizing the portion of cloud computing environment 220 to perform tasks. For example, data may be lost when the user is attempting to store information in the portion of cloud computing environment 220. User device 210 may receive an indication of the problem, and may display the indication to the user. In some implementations, the indication may include information associated with the problem (e.g., "All of the information was not stored in your virtualized storage").

As further shown in FIG. 4, process 400 may include providing a request, to a computing resource of the cloud computing environment, for provisioning of a virtual packet analyzer (block 420). For example, after receiving the indication of the problem, the user may utilize user device 210 to generate a request for provisioning of a virtual packet analyzer in order to debug the problem. In some implementations, the user may generate the request instead of requesting a provider of cloud computing environment 220 to manually debug the problem. User device 210 may provide the request to a particular computing resource 230 provided in the portion of cloud computing environment 220 allocated to the user. In some implementations, user device 210 may provide the request to a particular computing resource 230 not provided in the portion of cloud computing environment 220 allocated to the user. The particular computing resource 230 may receive the request, and may create virtual packet analyzer 240 in the particular computing resource 230 based on the request.

As shown in FIG. 4, process 400 may include receiving, from the computing resource of the cloud computing environment, an indication that the virtual packet analyzer has been provisioned (block 430). For example, after the particular computing resource 230 creates virtual packet analyzer 240, the particular computing resource 230 may generate an indication that virtual packet analyzer 240 has been provisioned in the particular computing resource 230. The particular computing resource 230 may provide the indication to user device 210, and user device 210 may receive the indication.

As further shown in FIG. 4, process 400 may include utilizing the virtual packet analyzer to troubleshoot the problem (block 440). For example, virtual packet analyzer 240 may intercept and log packets passing over the portion of cloud computing environment 220 allocated to the user. As the packets flow across the portion of cloud computing environment 220, virtual packet analyzer 240 may capture packets, and may decode each captured packet's raw data, showing values of various fields in the packet. Virtual packet analyzer 240 may analyze the packet content according to particular standards (e.g., RFCs), rules, policies, and/or other specifications. Based on this analysis, virtual packet analyzer 240 may identify any problems associated with the packet. For example, virtual packet analyzer 240 may determine that the problem is that virtualized storage 236 of the portion of cloud computing environment 220 has an incorrect address. In some implementations, virtual packet analyzer 240 may correct the identified problem (e.g., may correct the address of virtualized storage 236). In some implementations, virtual packet analyzer 240 may provide information associated with the identified problem to user device 210, and user device 210 may display the information to the user. The user may utilize the information to correct the identified problem.

In some implementations, virtual packet analyzer 240 may be used to analyze problems in the portion of cloud computing environment 220, detect intrusion attempts in the portion of cloud computing environment 220, monitor bandwidth utilization in the portion of cloud computing environment 220, monitor usage of the portion of cloud computing environment 220, filter suspect content from the portion of cloud computing environment 220, debug client/server communications in the portion of cloud computing environment 220, debug network protocol implementations in the portion of cloud computing environment 220, or perform another function that facilitates the debugging of problems in cloud computing environment 220.

As shown in FIG. 4, process 400 may include removing the virtual packet analyzer from the computing resource of the cloud computing environment when the problem is corrected (block 450). For example, after the identified problem is corrected, either by the user or via virtual packet analyzer 240, the user may utilize user device 210 to instruct the particular computing resource 230 to remove virtual packet analyzer 240. The particular computing resource 230 may receive the instruction from user device 210, and may remove virtual packet analyzer 240. Removal of virtual packet analyzer 240 may conserve resources in the portion of cloud computing environment 220 and may save the user money.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. Further, one or more blocks may be omitted in some implementations.

FIGS. 5A-5F are diagrams of an example 500 of the process described above with respect to FIG. 4. In example 500, assume that a user is allocated one or more computing resources 230 of cloud computing environment 220 and that the allocated computing resources 230 create a user portion 510 of cloud computing environment 220, as shown in FIG. 5A. For example, a first computing resource 230 may provide virtualized storage 236 for user device 210 associated with the user, and a second computing resource 230 may provide VM 234 for user device 210.

In example 500, further assume that the user utilizes user device 210 to interact with user portion 510 of cloud computing environment 220. For example, the user may utilize a software application (e.g., an accounting application, a database application, etc.) provided by user portion 510 of cloud computing environment 220. The user may utilize user device 210 to provide information (e.g., a packet 520) to the software application provided by user portion 510. As further shown in FIG. 5A, the user may experience a problem 530 during the user's interaction with user portion 510 of cloud computing environment 220. For example, assume that packet 520 is lost when the user is utilizing the software application provided by user portion 510. User device 210 may receive an indication of problem 530 from user portion 510, and may display the indication to the user. For example, user device 210 may display information indicating that packet 520 was not provided to a correct VM 234.

As shown in FIG. 5B, the software application of user portion 510 may provide a user interface 540 to user device 210 when the user is interacting with the software application. For example, user interface 540 may instruct the user to provide information to the software application. If the user elects to provide the information to the software application, packet 520 may be provided to user portion 510, as shown in FIG. 5A. However, because of problem 530, the information may not be provided to the software application.

Figure 5C:
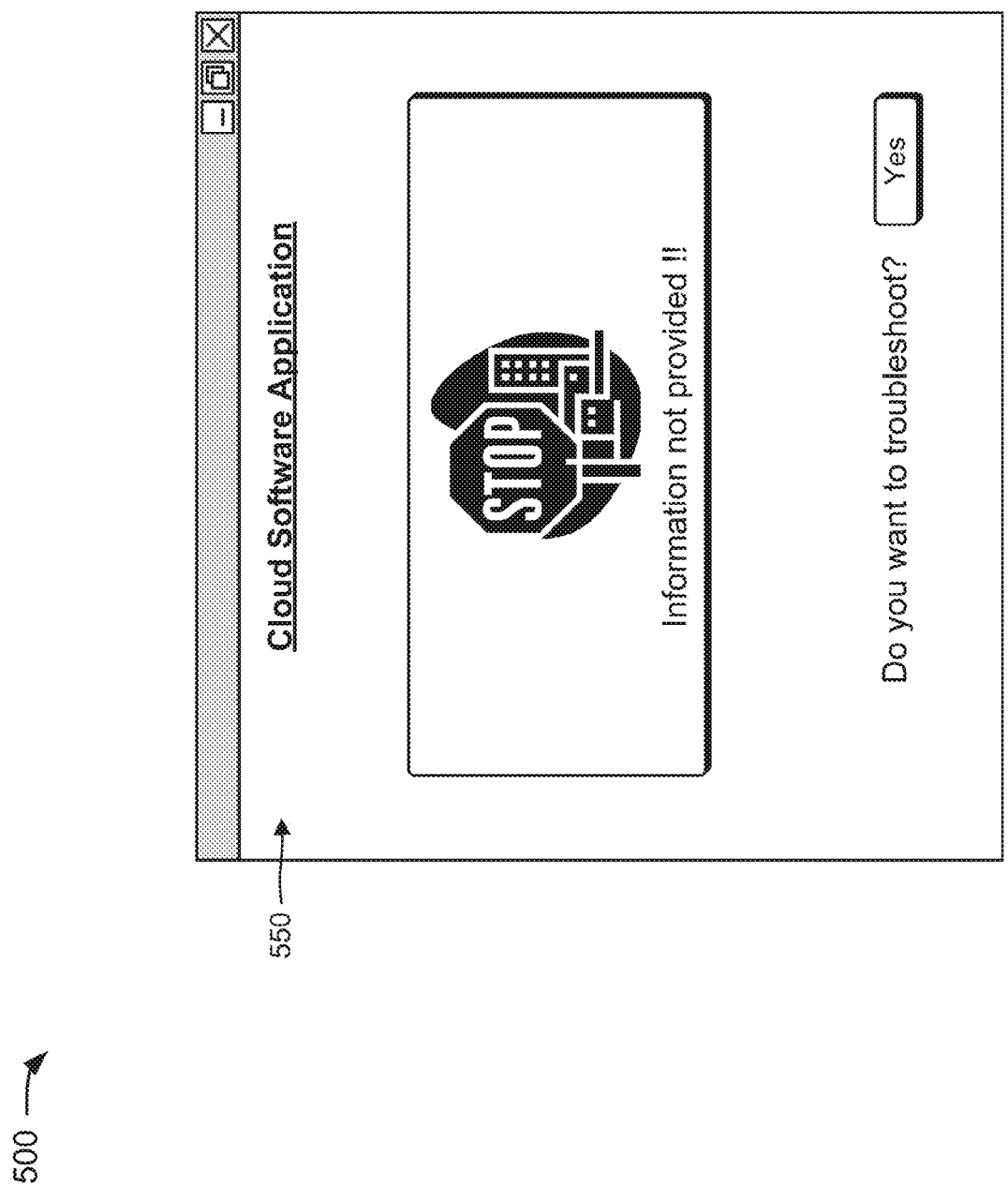

When this occurs, user device 210 may receive, from user portion 510, the indication of problem 530, and may display the indication via a user interface 550 as shown in FIG. 5C. For example, user interface 550 may indicate that the information was not provided to the software application, and may ask whether the user wants to troubleshoot problem 530.

If the user elects to troubleshoot problem 530, user device 210 may receive, from user portion 510, another user interface 560, and may display user interface 560 to the user, as shown in FIG. 5D. As further shown in FIG. 5D, user interface 560 may request that the user select a type of virtual packet analyzer 240 for troubleshooting problem 530. For example, the user may select one or more of a packet sniffer, a network analyzer, a protocol analyzer, an Ethernet sniffer, etc. in order to troubleshoot problem 530. As shown in FIG. 5D, assume that the user selects a packet sniffer as the type of virtual packet analyzer 240 to troubleshoot problem 530.

Figure 5E:
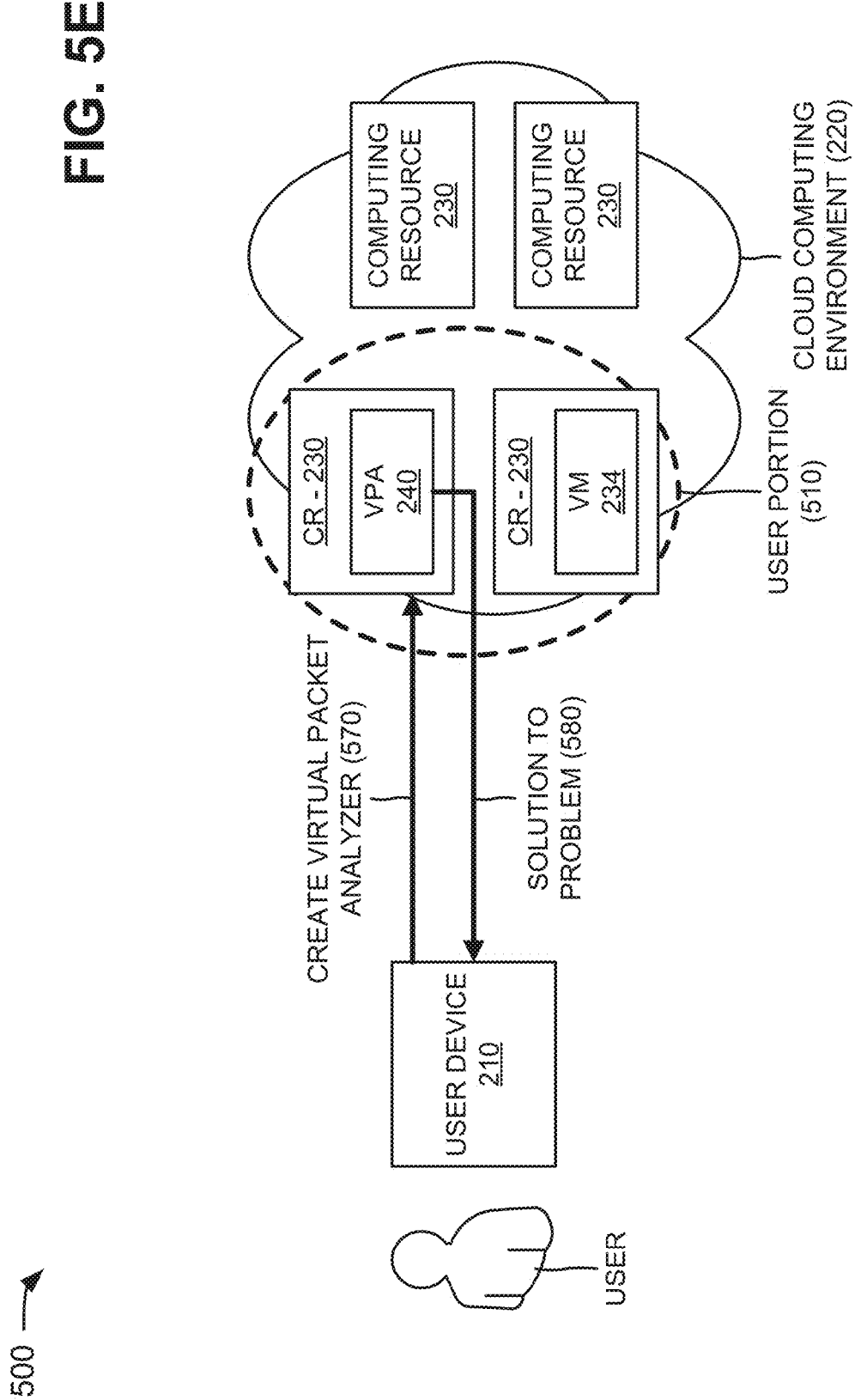

After selecting the type of virtual packet analyzer 240, user device 210 may instruct a particular computing resource 230 to create virtual packet analyzer 240, as indicated by reference number 570 in FIG. 5E. The particular computing resource 230 may receive the instruction from user device 210, and may create virtual packet analyzer 240 (e.g., the packet sniffer). As packets flow across user portion 510, virtual packet analyzer 240 may capture the packets, and may decode each captured packet's raw data, showing values of various fields in the packet. Virtual packet analyzer 240 may analyze the packet content according to particular standards, rules, policies, and/or other specifications. For example, virtual packet analyzer 240 may determine whether addresses provided in the packet match addresses for resources provided in user portion 510.

Figure 5F:
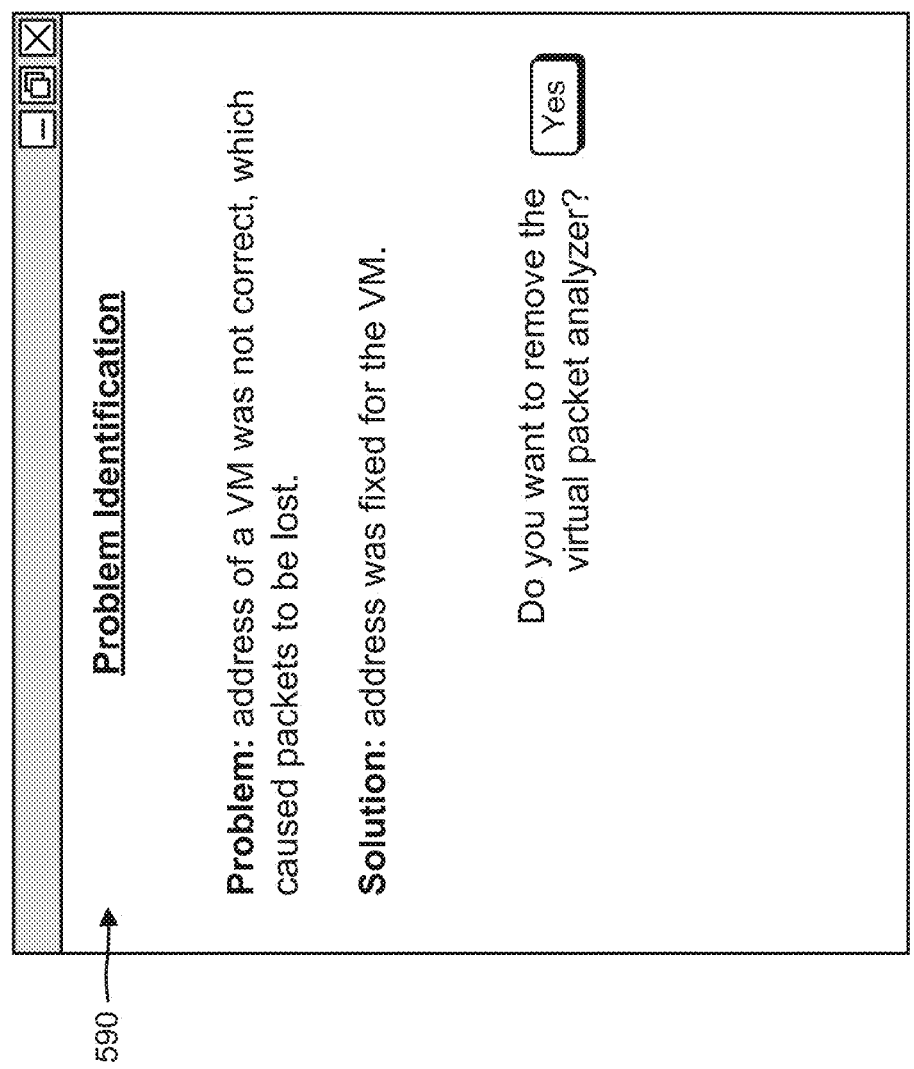

Based on the analysis, virtual packet analyzer 240 may identify any problems associated with the packet. For example, virtual packet analyzer 240 may determine that the problem is that VM 234 of user portion 510 of cloud computing environment 220 has an incorrect address. Virtual packet analyzer 240 may determine a solution 580 to the identified problem (e.g., may correct the address of VM 234), and may provide an indication of solution 580 to user device 210, as further shown in FIG. 5E. For example, virtual packet analyzer 240 may provide, to user device 210, a user interface 590 that provides information associated with solution 580, as shown in FIG. 5F. User interface 590 may provide information associated with problem 530 (e.g., "an address of a VM was not correct, which caused packets to be lost") and solution 580 (e.g., "address was fixed for the VM"). In some implementations, virtual packet analyzer 240 may provide information associated with problem 530 to user device 210, and user device 210 may display the information to the user. The user may utilize the information to correct problem 530.

As further shown in FIG. 5F, user interface 590 may inquire whether the user wants to remove virtual packet analyzer 240 from user portion 510. If the user elects to remove virtual packet analyzer 240 from user portion 510, user device 210 may instruct the particular computing resource 230 to remove virtual packet analyzer 240. The particular computing resource 230 may receive the instruction from user device 210, and may remove virtual packet analyzer 240.

As indicated above, FIGS. 5A-5F are provided merely as an example. Other examples are possible and may differ from what was described with regard to FIGS. 5A-5F.

FIG. 6 is a flow chart of an example process 600 for utilizing a virtual packet analyzer in a cloud computing environment. In some implementations, process 600 may be performed by computing resource 230. In some implementations, process 600 may be performed by another device or a group of devices separate from or including computing resource 230.

As shown in FIG. 6, process 600 may include receiving a packet associated with a user portion of a cloud computing environment (block 610). For example, when a problem occurs in a portion of cloud computing environment 220 allocated to a user, the portion of cloud computing environment 220 may enable the user to troubleshoot the problem. The user, via user device 210, may instruct a particular computing resource 230, of the portion of cloud computing environment 220, to create virtual packet analyzer 240 in order to troubleshoot the problem. Packets may be generated in the portion of cloud computing environment 220 when user device 210 interacts with the portion of cloud computing environment 220. Virtual packet analyzer 240 may receive one or more packets generated during the interactions between user device 210 and the portion of cloud computing environment 220.

As further shown in FIG. 6, process 600 may include identifying a flow of the packet based on information associated with the packet (block 620). For example, a packet may include (e.g., in a header portion of the packet) information identifying a destination device associated with the packet (e.g., an address associated with computing resource 230 of the portion of cloud computing environment 220); information identifying hardware of the destination device (e.g., an address of a network interface card (NIC) of computing resource 230); information identifying a VLAN of the hardware (e.g., an address of a VLAN associated with the NIC); etc. In some implementations, virtual packet analyzer 240 may determine the address of computing resource 230, the address of the NIC, and the address of the VLAN from the header of the packet. Virtual packet analyzer 240 may determine a flow of the packet based on information associated with the packet, such as, for example, the address of computing resource 230, the address of the NIC, the address of the VLAN, etc. In some implementations, virtual packet analyzer 240 may determine other packets associated with the flow.

As shown in FIG. 6, process 600 may include determining whether to duplicate the packet based on the flow and/or the information associated with the packet (block 630). For example, virtual packet analyzer 240 may compare the flow, and/or the information associated with the packet, with information associated with the problem in order to determine whether to duplicate the packet. In some implementations, the duplicate packet may be used to debug the problem by the user, virtual packet analyzer 240, and/or another device. In some implementations, the information associated with the problem may be logged by the portion of cloud computing environment 220 when the problem occurs. For example, when the problem occurs, the portion of cloud computing environment 220 may log information associated with lost or dropped packets, such as, for example, source information of the packets (e.g., addresses of source devices, NICs, VLANs, etc.), destination information of the packets (e.g., addresses of destination devices, NICs, VLANs, etc.), problem information (e.g., whether the packets were dropped, lost, partially delivered, etc.), etc. In some implementations, the portion of cloud computing environment 220 may log information associated with any problems that occur at any time in the portion of cloud computing environment 220.

In some implementations, if the flow, and/or the information associated with the packet, matches some or all of the information logged by the portion of cloud computing environment 220, virtual packet analyzer 240 may determine that the packet is to be duplicated. In some implementations, if the flow, and/or the information associated with the packet, does not match any of the information logged by the portion of cloud computing environment 220, virtual packet analyzer 240 may determine that the packet is not to be duplicated. In some implementations, the packet may not be duplicated since the packet may not be associated with a problem and thus may not be useful in debugging the problem.

As further shown in FIG. 6, if the packet is to be duplicated (block 630—DUPLICATE), process 600 may include generating a duplicate packet and sending the packet to a destination (block 640). For example, if virtual packet analyzer 240 determines that the packet is to be duplicated (e.g., since the packet is associated with a problem), virtual packet analyzer 240 may duplicate the packet. In some implementations, virtual packet analyzer 240 may provide the original packet to a destination associated with the packet. For example, virtual packet analyzer 240 may provide the packet to an address associated with a destination computing resource 230, a destination VM 234, a destination virtualized storage 236, a destination hypervisor 238, etc. provided in the portion of cloud computing environment 220.

As shown in FIG. 6, if the packet is to be duplicated (block 630—DUPLICATE), process 600 may include sending the duplicate packet to a device for further analysis (block 650). For example, if virtual packet analyzer 240 determines that the packet is to be duplicated, virtual packet analyzer 240 may provide the duplicate packet to a device for further analysis. In some implementations, the particular computing resource 230, associated with virtual packet analyzer 240, may perform the further analysis on the duplicate packet in order to determine a cause of the problem. In some implementations, virtual packet analyzer 240 may provide the duplicate packet to user device 210 so that the user may determine the cause of the problem. In some implementations, another device, separate from the particular computing resource 230 and user device 210, may perform the further analysis on the duplicate packet in order to determine the cause of the problem. In some implementations, the particular computing resource 230, the other device, and/or user device 210 may be utilized to correct the cause of the problem.

As further shown in FIG. 6, if the packet is not to be duplicated (block 630—DO NOT DUPLICATE), process 600 may include sending the packet to the destination (block 660). For example, if virtual packet analyzer 240 determines that the packet is not to be duplicated (e.g., since the packet is not associated with a problem), virtual packet analyzer 240 may provide the original packet to a destination associated with the packet. For example, virtual packet analyzer 240 may provide the packet to an address associated with a destination computing resource 230, a destination VM 234, a destination virtualized storage 236, a destination hypervisor 238, etc. provided in the portion of cloud computing environment 220.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Further, one or more blocks may be omitted in some implementations.

FIGS. 7A-7C are diagrams of an example 700 of the process described above with respect to FIG. 6. In example 700, assume that a user utilizes user device 210 to interact with a portion of cloud computing environment 220 allocated to the user. Further assume that the user experiences a problem during the interaction with the portion of cloud computing environment 220 and instructs, via user device 210, the portion of cloud computing environment 220 to create virtual packet analyzer 240. After virtual packet analyzer 240 is established, assume that user device 210 further interacts with the portion of cloud computing environment 220. The interactions may cause a source computing resource 230, provided in the portion of cloud computing environment 220, to generate a packet 710, as shown in FIG. 7A.

As further shown in FIG. 7A, packet 710 may include information (e.g., Destination CR1) associated with a destination computing resource 230, information (e.g., Destination NIC1) associated with a NIC provided in the destination computing resource 230, and information (e.g., Destination VLAN1) associated with a VLAN of the NIC. The source computing resource 230 may provide packet 710 to the destination computing resource 230, and virtual packet analyzer 240 may intercept packet 710 before it is provided to the destination computing resource 230.

In example 700, further assume that the portion of cloud computing environment 220 creates a data structure 720 for logging information associated with problems that occur in the portion of cloud computing environment 220, as shown in FIG. 7B. Data structure 720 may include a database, a table, a list, an array, etc. As further shown in FIG. 7B, data structure 720 may include a table with a server field, a hardware field, a VLAN field, and multiple entries associated with the fields. In some implementations, data structure 720 may include a different type of data structure, different fields, additional fields, and/or differently arranged fields.

The server field may include addresses (e.g., Internet protocol (IP) addresses, media access control (MAC) addresses, etc.) of destination computing resources 230 that receive packets associated with the problems that occur in the portion of cloud computing environment 220. For example, assume that a first computing resource 230 includes an address (e.g., CR1), a second computing resource 230 includes an address (e.g., CR2), and a fifth computing resource 230 includes an address (e.g., CR5).

The hardware field may include addresses (e.g., IP addresses, MAC addresses, etc.) of hardware associated with the destination computing resources 230 identified in the server field. For example, a NIC may be provided on the first computing resource 230 and may include an address (e.g., NIC1). A NIC may be provided on the second computing resource 230 and may include an address (e.g., NIC3). A NIC may be provided on the fifth computing resource 230 and may include an address (e.g., NIC2).

The VLAN field may include addresses (e.g., IP addresses) of VLANs associated with the hardware identified in the hardware field. For example, a VLAN may be associated with the first NIC and may include an address (e.g., VLAN1). A VLAN may be associated with the third NIC and may include an address (e.g., VLAN4). A VLAN may be associated with the second NIC and may include an address (e.g., VLAN3).

In example 700, virtual packet analyzer 240 may compare the information provided in packet 710 with the information provided in data structure 720 in order to determine whether to duplicate packet 710. If the information provided in packet 710 matches some or all of the information provided in data structure 720, virtual packet analyzer 240 may determine that packet 710 is to be duplicated. If the information provided in packet 710 does not match any of the information provided in data structure 720, virtual packet analyzer 240 may determine that packet 720 is not to be duplicated. As shown in FIG. 7B, since the information of packet 710 matches a row of entries of data structure 720, virtual packet analyzer 240 may determine that packet 710 is to be duplicated.

If virtual packet analyzer 240 determines that packet 710 is to be duplicated based on a match 730 with the information provided in data structure 720, virtual packet analyzer 240 may create a duplicate 740 of packet 710, as shown in FIG. 7C. As further shown in FIG. 7C, virtual packet analyzer 240 may provide packet 710 to a destination computing resource 230, and may provide duplicate packet 740 to user device 210. A user associated with user device 210 may utilize duplicate packet 740 to determine the cause of the problem. If virtual packet analyzer 240 determines that packet 710 is not to be duplicated based on no matches 750 with the information provided in data structure 720, virtual packet analyzer 240 may provide packet 710 to the destination computing resource 230, as further shown in FIG. 7C.

As indicated above, FIGS. 7A-7C are provided merely as an example. Other examples are possible and may differ from what was described with regard to FIGS. 7A-7C.

Systems and/or methods described herein may provide a virtual packet analyzer that enables a user to debug problems associated with cloud resources allocated to the user in a cloud computing environment. The virtual packet analyzer may intercept and log packets transmitted within the cloud computing environment. As packets flow across the cloud computing environment, the virtual packet analyzer may capture packets and, if needed, may decode each captured packet's raw data, showing values of various fields in the packet. The virtual packet analyzer may analyze the packet content according to particular standards, rules, policies, and/or other specifications. Based on this analysis, the virtual packet analyzer may identify any problems associated with the packet.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

As used herein, the term "user" is intended to be broadly interpreted to include a user device, or a user of a user device.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a user device (e.g., via a touch screen display, a mouse, a keyboard, a keypad, voice commands, etc.).

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a device and from a user device, problem information associated with a portion of a cloud computing environment associated with a user of the user device,
        the problem information indicating a first address for a resource associated with a problem occurring within the portion of the cloud computing environment,
        the resource being provided in the portion of the cloud computing environment;
    receiving, by the device and from the user device associated with the user, an instruction to create a virtual packet analyzer in the device, until the problem is resolved,
        the device being provided in the cloud computing environment,
        the instruction including information identifying a type of virtual packet analyzer selected by the user via the user device,
        the type of virtual packet analyzer being selected, by the user, from one of a virtual packet sniffer or a virtual network analyzer;
    creating, by the device, the virtual packet analyzer in the device based on the instruction;
    receiving, by the virtual packet analyzer of the device, a packet,
        the packet being provided in the portion of the cloud computing environment associated with the user;
    analyzing, by the virtual packet analyzer of the device, the packet based on one or more of a standard, a rule, a policy, or a specification;
    determining, by the virtual packet analyzer of the device, information associated with the packet, based on analyzing the packet,
        the information associated with the packet including a second address for a destination of the packet;
    determining, by the virtual packet analyzer of the device, whether to duplicate the packet based on whether the second address included in the information associated with the packet matches the first address included in the problem information,
        the information associated with the packet being separate from the problem information;
    processing, by the virtual packet analyzer of the device, the packet based on whether the packet is to be duplicated,
        a duplicate packet of the packet being generated when it is determined that the packet is to be duplicated,
            the duplicate packet being transmitted to another device to identify or resolve the problem occurring within the portion of the cloud computing environment, and
        the packet being transmitted to the destination of the packet when it is determined that the packet is not to be duplicated; and
    removing, by the device, the virtual packet analyzer from the device when the problem is resolved.

2. The method of claim 1, where the instruction to create the virtual packet analyzer is received based on the problem occurring within the portion of the cloud computing environment associated with the user.

3. The method of claim 1, further comprising:
    analyzing the duplicate packet to determine a cause of the problem; and
    correcting the problem based on analyzing the duplicate packet.

4. The method of claim 1, where determining whether to duplicate the packet comprises:
    determining that the packet is to be duplicated when the second address included in the information associated with the packet matches the first address included in the problem information; and
    determining that the packet is not to be duplicated when the second address included in the information associated with the packet does not match the first address included in the problem information.

5. The method of claim 1, further comprising:
    transmitting the duplicate packet to the other device to cause the other device to analyze the duplicate packet to determine a cause of the problem, and correct the problem based on analyzing the duplicate packet.

6. The method of claim 1, where the first address includes one or more of:
    an address of a resource device associated with the resource, an address of hardware provided on the resource device, or an address of a virtual local area network (VLAN) associated with the hardware provided on the resource device; and where the second address includes one or more of:
an address of a destination device associated with the packet,
an address of hardware provided on the destination device, or
an address of a VLAN associated with the hardware provided on the destination device.

7. A device comprising:
one or more processors to:
receive, from a user device, problem information associated with a portion of a cloud computing environment associated with a user of the user device,
the problem information indicating a first address for a resource associated with a problem occurring within the portion of the cloud computing environment,
the resource being provided in the portion of the cloud computing environment,
receive, from the user device, an instruction to create a virtual packet analyzer in the device, until the problem is resolved,
the device being provided in the cloud computing environment,
the instruction including information identifying a type of virtual packet analyzer selected by the user via the user device,
the type of virtual packet analyzer being selected, by the user, from one of a virtual packet sniffer or a virtual network analyzer,
create the virtual packet analyzer in the device based on the instruction,
receive, by the virtual packet analyzer, a packet,
the packet being provided in the portion of the cloud computing environment,
analyze, by the virtual packet analyzer, the packet based on one or more of a standard, a rule, a policy, or a specification,
determine, by the virtual packet analyzer, information associated with the packet, based on analyzing the packet,
the information associated with the packet including a second address for a destination of the packet,
determine, by the virtual packet analyzer, whether to duplicate the packet based on whether the second address included in the information associated with the packet matches the first address included in the problem information,
the information associated with the packet being separate from the problem information,
process, by the virtual packet analyzer, the packet based on whether the packet is to be duplicated,
a duplicate packet of the packet being generated when it is determined that the packet is to be duplicated,
the duplicate packet being transmitted to another device to identify or resolve the problem occurring within the portion of the cloud computing environment, and
the packet being transmitted to the destination of the packet when it is determined that the packet is not to be duplicated, and
remove the virtual packet analyzer from the device when the problem is resolved.

8. The device of claim 7, where the instruction to create the virtual packet analyzer is received based on the problem occurring within the portion of the cloud computing environment.

9. The device of claim 7, where the one or more processors are further to:
analyze the duplicate packet to determine a cause of the problem, and
correct the problem based on analyzing the duplicate packet.

10. The device of claim 7, where, when determining whether to duplicate the packet, the one or more processors are to:
determine that the packet is to be duplicated when the second address included in the information associated with the packet matches the first address included in the problem information, and
determine that the packet is not to be duplicated when the second address included in the information associated with the packet does not match the first address included in the problem information.

11. The device of claim 7, where the one or more processors are further to:
transmit the duplicate packet to the other device to cause the other device to analyze the duplicate packet to determine a cause of the problem, and correct the problem based on analyzing the duplicate packet.

12. The device of claim 7, where the first address includes one or more of:
an address of a resource device associated with the resource,
an address of hardware provided on the resource device, or
an address of a virtual local area network (VLAN) associated with the hardware provided on the resource device; and where the second address includes one or more of:
an address of a destination device associated with the packet,
an address of hardware provided on the destination device, or
an address of a VLAN associated with the hardware provided on the destination device.

13. A non-transitory computer-readable medium storing instructions, the instructions comprising:
one or more instructions that, when executed by one or more processors of a device of a cloud computing environment, cause the one or more processors to:
receive, from a user device, problem information associated with a portion of the cloud computing environment associated with a user of the user device,
the problem information indicating a first address for a resource associated with a problem occurring within the portion of the cloud computing environment,
the resource being provided in the portion of the cloud computing environment;
receive, from the user device associated with the user, an instruction to create a virtual packet analyzer in the device, until the problem is resolved,
the device being provided in the cloud computing environment,
the instruction including information identifying a type of virtual packet analyzer selected by the user via the user device, the type of virtual packet analyzer being selected, by the user, from one of a virtual packet sniffer or a virtual network analyzer;
implement, in the device and based on the instruction, the virtual packet analyzer to:
  receive a packet,
    the packet being transmitted within the portion of the cloud computing environment associated with the user,
  analyze, by the virtual packet analyzer, the packet based on one or more of a standard, a rule, a policy, or a specification;
  determine information associated with the packet, based on analyzing the packet,
    the information associated with the packet including a second address for a destination of the packet,
  determine whether to duplicate the packet based on whether the second address included in the information associated with the packet matches the first address included in the problem information,
    the information associated with the packet being separate from the problem information, and
  process the packet based on whether the packet is to be duplicated,
    a duplicate packet of the packet being generated when it is determined that the packet is to be duplicated,
      the duplicate packet being transmitted to another device to identify or resolve the problem occurring within the portion of the cloud computing environment, and
    the packet being transmitted to the destination of the packet when it is determined that the packet is not to be duplicated; and
  remove the virtual packet analyzer from the device when the problem is resolved.

14. The non-transitory computer-readable medium of claim 13, where the instruction to create the virtual packet analyzer is received based on the problem occurring within the portion of the cloud computing environment.

15. The non-transitory computer-readable medium of claim 13, where the one or more instructions, when executed by the one or more processors, further cause the one or more processors to:
  analyze the duplicate packet to determine a cause of the problem, and
  correct the problem based on analyzing the duplicate packet.

16. The non-transitory computer-readable medium of claim 13, where the one or more instructions, when executed by the one or more processors, further cause the one or more processors to:
  determine that the packet is to be duplicated when the second address included in the information associated with the packet matches the first address included in the problem information, and
  determine that the packet is not to be duplicated when the second address included in the information associated with the packet matches the first address included in the problem information.

17. The non-transitory computer-readable medium of claim 13, where the one or more instructions, when executed by the one or more processors, further cause the one or more processors to:
  transmit the duplicate packet to the other device to cause the other device to analyze the duplicate packet to determine a cause of the problem, and
  correct the problem based on analyzing the duplicate packet.

18. The non-transitory computer-readable medium of claim 13, where the virtual packet analyzer includes one of:
  the virtual packet sniffer, or
  the virtual network analyzer.

19. The non-transitory computer-readable medium of claim 13, where the first address includes one or more of:
  an address of a resource device associated with the resource,
  an address of hardware provided on the resource device, or
  an address of a virtual local area network (VLAN) associated with the hardware provided on the resource device.

20. The non-transitory computer-readable medium of claim 13, where the second address includes one or more of:
  an address of a destination device associated with the packet,
  an address of hardware provided on the destination device, or
  an address of a virtual local area network (VLAN) associated with the hardware provided on the destination device.

* * * * *